US008345696B2

(12) United States Patent
Kuramoto et al.

(10) Patent No.: US 8,345,696 B2
(45) Date of Patent: Jan. 1, 2013

(54) ROUTER AND PACKET DISCARDING METHOD

(75) Inventors: Michio Kuramoto, Kawasaki (JP); Yasuyuki Mitsumori, Kawasaki (JP); Kanta Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 255 days.

(21) Appl. No.: 12/545,168

(22) Filed: Aug. 21, 2009

(65) Prior Publication Data

US 2010/0046533 A1  Feb. 25, 2010

(30) Foreign Application Priority Data

Aug. 25, 2008  (JP) .................................. 2008-214753

(51) Int. Cl.
*H04L 12/28* (2006.01)
(52) U.S. Cl. ........................................ 370/401; 375/347
(58) Field of Classification Search .................. 370/401; 375/347
See application file for complete search history.

(56) References Cited

U.S. PATENT DOCUMENTS

| | | | |
|---|---|---|---|
| 6,088,407 A * | 7/2000 | Buternowsky et al. ....... | 375/347 |
| 2003/0012197 A1 | 1/2003 | Yazaki et al. | |
| 2005/0213504 A1 * | 9/2005 | Enomoto et al. .............. | 370/235 |
| 2006/0067231 A1 * | 3/2006 | Ikoma et al. .................. | 370/235 |
| 2007/0201836 A1 * | 8/2007 | Tsubota et al. ................ | 386/96 |
| 2007/0286217 A1 * | 12/2007 | Miyata .......................... | 370/401 |
| 2008/0049753 A1 * | 2/2008 | Heinze et al. ................. | 370/392 |

FOREIGN PATENT DOCUMENTS

| | | |
|---|---|---|
| JP | 6-152699 | 5/1994 |
| JP | 9-326824 | 12/1997 |
| JP | 2003-18204 | 1/2003 |
| JP | 2004-134969 | 4/2004 |
| JP | 2006-254134 | 9/2006 |

OTHER PUBLICATIONS

Iwamura, Atsushi, "Introduction of detail mechanism of Ether OAM (Y. 17ethoam)", Technical Report of the Institute of Electronics, Information and Communication Engineers (IEICE), vol. 104, No. 380, Japan, Oct. 21, 2004, pp. 39-40.
Office Action issued by the Japanese Patent Office on May 1, 2012 in the corresponding Japanese patent application No. 2008-214753.

\* cited by examiner

*Primary Examiner* — Robert Wilson
*Assistant Examiner* — Wei Zhao
(74) *Attorney, Agent, or Firm* — Staas & Halsey LLP

(57) ABSTRACT

A router controlling a route of packets. The router includes a counter counting an amount of received control packets on a user-identifier-by-user-identifier basis, the control packets being used for managing a network, a discard determining unit comparing a counter value of the counter with a threshold value, and a control packet discarding unit discarding a control packet including a user identifier for which the discard determining unit determines that the counter value exceeds the threshold value.

14 Claims, 13 Drawing Sheets

* ADD IF VLAN TAG NEEDS TO BE ADDED

FIG. 3

| SEARCH KEY | CONTENTS | | | | | | |
|---|---|---|---|---|---|---|---|
| USER ID (VLAN) | UPPER THRESHOLD | RECEPTION CONTROL SETTING | USER INFORMATION DISPLAY SETTING | GROUP SETTING | OAM TYPE SETTING | EFFECTIVE DATA SETTING | PACKET COUNT SETTING |
| USER A (101) | CC:5000 (BYTES) | | | | | | |
| USER B (102) | LB:0000 (BYTES) | DISCARD | DISPLAY | GROUP 1 | ENABLED | ENABLED | DISABLED |
| USER C (103) | LT:0100 (BYTES) ... | | | | | | |
| USER D (200) | 6656 (BYTES) | DISCARD | DISPLAY | GROUP 2 | DISABLED | ENABLED | DISABLED |
| USER E (1000) | 9,999,999 (PACKETS) | DISCARD | DISPLAY | GROUP 3 | DISABLED | DISABLED | ENABLED |
| USER F (2000) | 64 (PACKETS) | RECEIVE | NOT DISPLAY | GROUP 4 | DISABLED | DISABLED | ENABLED |

FIG. 4

| ADDRESS VALUE | COUNTER VALUE |
|---|---|
| USER ID (VLAN) | OAM PACKET COUNTER VALUE |
| USER A (101) | CC:530 (BYTES) |
| USER B (102) | LB:12 (BYTES) |
| USER C (103) | LT:0 (BYTES) ... |
| USER D (200) | 354 (BYTES) |
| USER E (1000) | 85,495,898 (PACKETS) |
| USER F (2000) | 0 (PACKETS) |

FIG. 9

| ADDRESS VALUE | COUNTER VALUE |
|---|---|
| USER ID (VLAN) | DISCARDED OAM PACKET COUNTER VALUE |
| USER A (101) | CC:0 (BYTES) |
| USER B (102) | LB:0 (BYTES) |
| USER C (103) | LT:98 (BYTES) ... |
| USER D (200) | 56 (BYTES) |
| USER E (1000) | 0 (PACKETS) |
| USER F (2000) | 0 (PACKETS) |

FIG. 10

| SEARCH KEY | CONTENTS | | | | | | | | | | | | | |
|---|---|---|---|---|---|---|---|---|---|---|---|---|---|---|
| USER ID (VLAN) | UPPER THRE-SHOLD | RECEPTION CONTROL SETTING | USER INFORMA-TION DISPLAY SETTING | GROUP SETTING | OAM TYPE SETTING | EFFECTIVE DATA SETTING | PACKET COUNT SETTING | DISPLAY THRE-SHOLD | DISCARD USER INFORMA-TION DISPLAY SETTING | DIS-CARDED GROUP SETTING | DIS-CARDED OAM TYPE SETTING | DIS-CARDED EFFECTIVE DATA SETTING | DIS-CARDED PACKET COUNT SETTING |
| USER A (101) | CC:5000 (BYTES) | DISCARD | DISPLAY | GROUP 1 | ENABLED | ENABLED | DISABLED | CC:5000 (BYTES) | DISPLAY | GROUP 1 | ENABLED | ENABLED | DISABLED |
| USER B (102) | LB:0000 (BYTES) | | | | | | | LB:0000 (BYTES) | | | | | |
| USER C (103) | LT:0100 (BYTES) ... | | | | | | | LT:50 (BYTES) ... | | | | | |
| USER D (200) | 6656 (BYTES) | DISCARD | DISPLAY | GROUP 2 | DISABLED | ENABLED | DISABLED | 6656 (BYTES) | DISPLAY | GROUP 2 | DISABLED | ENABLED | DISABLED |
| USER E (1000) | 9,999,999 (PACKETS) | DISCARD | DISPLAY | GROUP 3 | DISABLED | DISABLED | ENABLED | 9,999,999 (PACKETS) | DISPLAY | GROUP 3 | DISABLED | DISABLED | ENABLED |
| USER F (2000) | 64 (PACKETS) | RECEIVE | NOT DISPLAY | GROUP 4 | DISABLED | DISABLED | ENABLED | 64 (PACKETS) | NOT DISPLAY | GROUP 4 | DISABLED | DISABLED | ENABLED |

ROUTER AND PACKET DISCARDING METHOD

CROSS-REFERENCE TO RELATED APPLICATION(S)

This application is based upon and claims the benefit of priority of the prior Japanese Patent Application No. 2008-214753, filed on Aug. 25, 2008, the entire contents of which are incorporated herein by reference.

FIELD

The embodiments discussed herein are related to a router that relays packets and a packet discarding method.

BACKGROUND

The widespread use of Ethernet (registered trademark) networks has created a need for improving the reliability of Ethernet networks and standards for maintenance and management of Ethernet networks are being established. The maintenance and management of an Ethernet network are performed by transmitting Ethernet OAM (Ethernet Operations, Administration, and Maintenance) packets from a computer or the like on a network to which a router belongs to the router.

FIG. 13 illustrates an exemplary configuration of a router that receives Ethernet OAM packets. Functions and other specifics of components included in the router will be described later in detail. When the router receives a packet 1 including a VLAN (Virtual Local Area Network) identifier 2, an input unit 20 processes the packets 1. When the packet 1 is sent to an OAM determining unit 23 through a VLAN extracting unit 21 and a user setting table 22, the OAM determining unit 23 determines whether the packet 1 is an OAM packet or not. If the packet 1 is a packet used for user data communication, an amount of packets permitted by a policer 24 are sent to a buffer 25 and are transmitted to the destination of the packets 1 through a switch 11 and output units 12. When the amount of packets 1 sent to the policer 24 exceeds the amount permitted by the policer 24, the excessive packets 1 are discarded. On the other hand, if the packet 1 is an OAM packet, the packet 1 is sent from the OAM determining unit 23 to an OAM buffer 26, then to a CPU 27, where the packet 1 is processed. All packets 1 determined to be OAM packets by the OAM determining unit 23 are sent to the OAM buffer 26 and the CPU 27.

A related art using OAM packets is disclosed in Japanese Patent Application Laid-Open No. 2004-134969, which is a central office terminal that determines that the central office terminal has received a power-off notification from a customer premises terminal if the central office terminal has detected that OAM packets from the customer premises terminal has been continuously received.

SUMMARY

A router includes a counter counting an amount of control packets on a user-identifier-by-user-identifier basis, the control packets being used for managing a network, a discard determining unit comparing a counter value of the counter with a threshold value, and a control packet discarding unit discarding a control packet including a user identifier for which the discard determining unit determines that the counter value exceeds the threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a use setting table;

FIG. 4 is a diagram illustrating an exemplary OAM counter;

FIG. 9 is a diagram illustrating an exemplary OAM discard counter;

FIG. 10 illustrates an exemplary user setting table included in a router;

DESCRIPTION OF EMBODIMENTS

Figure 13:
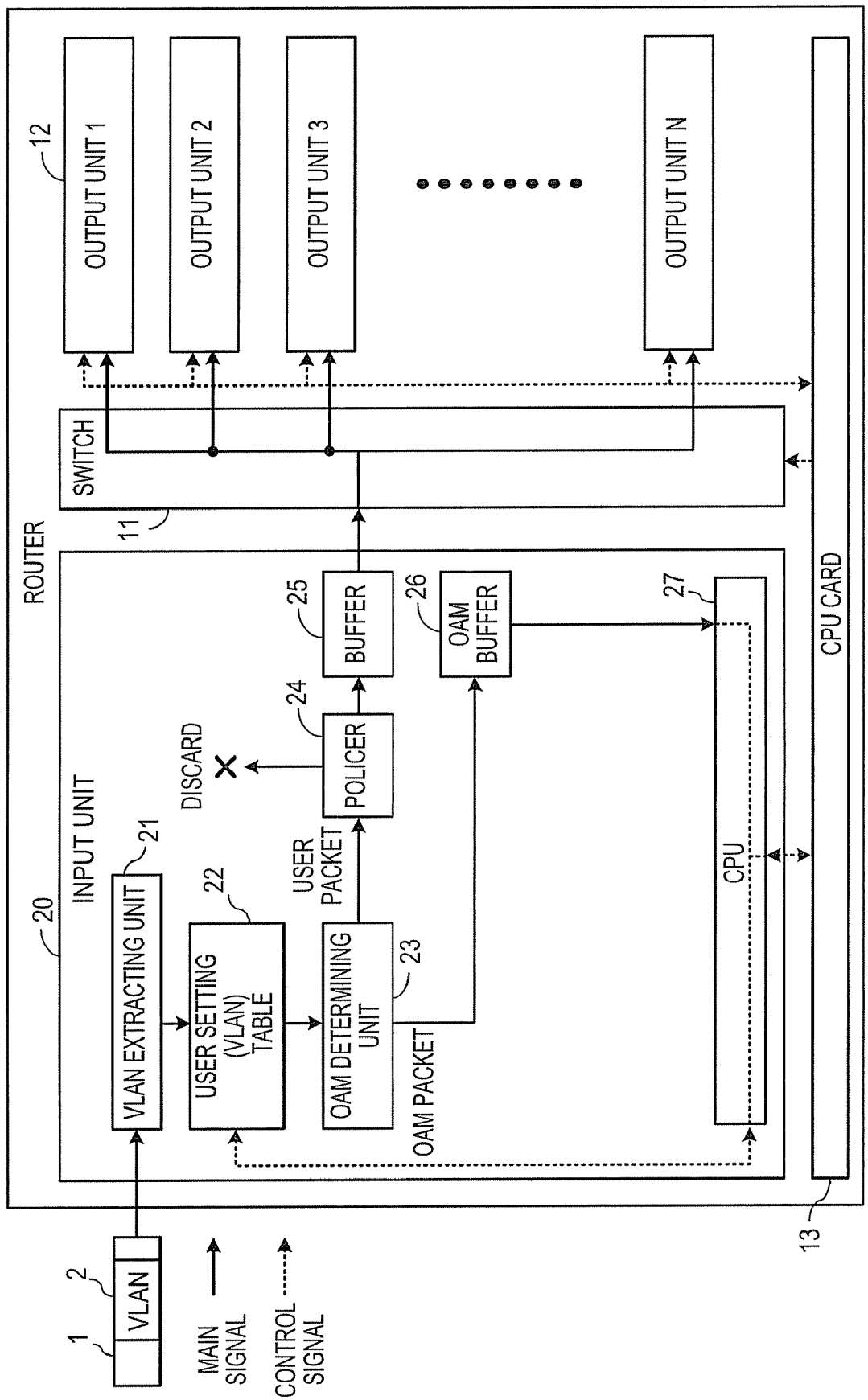
FIG. 13 is a diagram illustrating an exemplary configuration of a router which receives Ethernet OAM packets according to a related art.

In the configuration in which the CPU 27 processes all OAM packets received by the router 10 as shown in FIG. 13, the throughput of the CPU 27 can be degraded when a large number of OAM packets are received by the router 10. Furthermore, when the amount of OAM packets received exceeds the capacity of the CPU 27, the CPU 27 can hang up.

Embodiments of the present invention will be described below in detail with reference to the accompanying drawings. A router according to an embodiment of the present invention can be used on a network in which control packets are sent and received in addition to user packets used for sending and receiving data to and from users communicating with each other. The router can be applied to networks that impose a limit on the number of user packets to be received among other networks in any form in which user packets and control packets are sent and received. The term "control packet" as used herein refers to a packet that is sent and received between nodes for maintenance and management of a network through which user packets are sent and received.

For ready comparison with the related art, an example will be described below in which processing for Ethernet OAM is performed. It is assumed in the example described below that packets 1 received at the router 10 are Ethernet packets in any case of OAM and user packets. However, routers according to any of the embodiments described below are not limited to use for processing of Ethernet OAM packets, but can be used for processing any types of control packets.

First Embodiment

Apparatus Configuration

Figure 1:
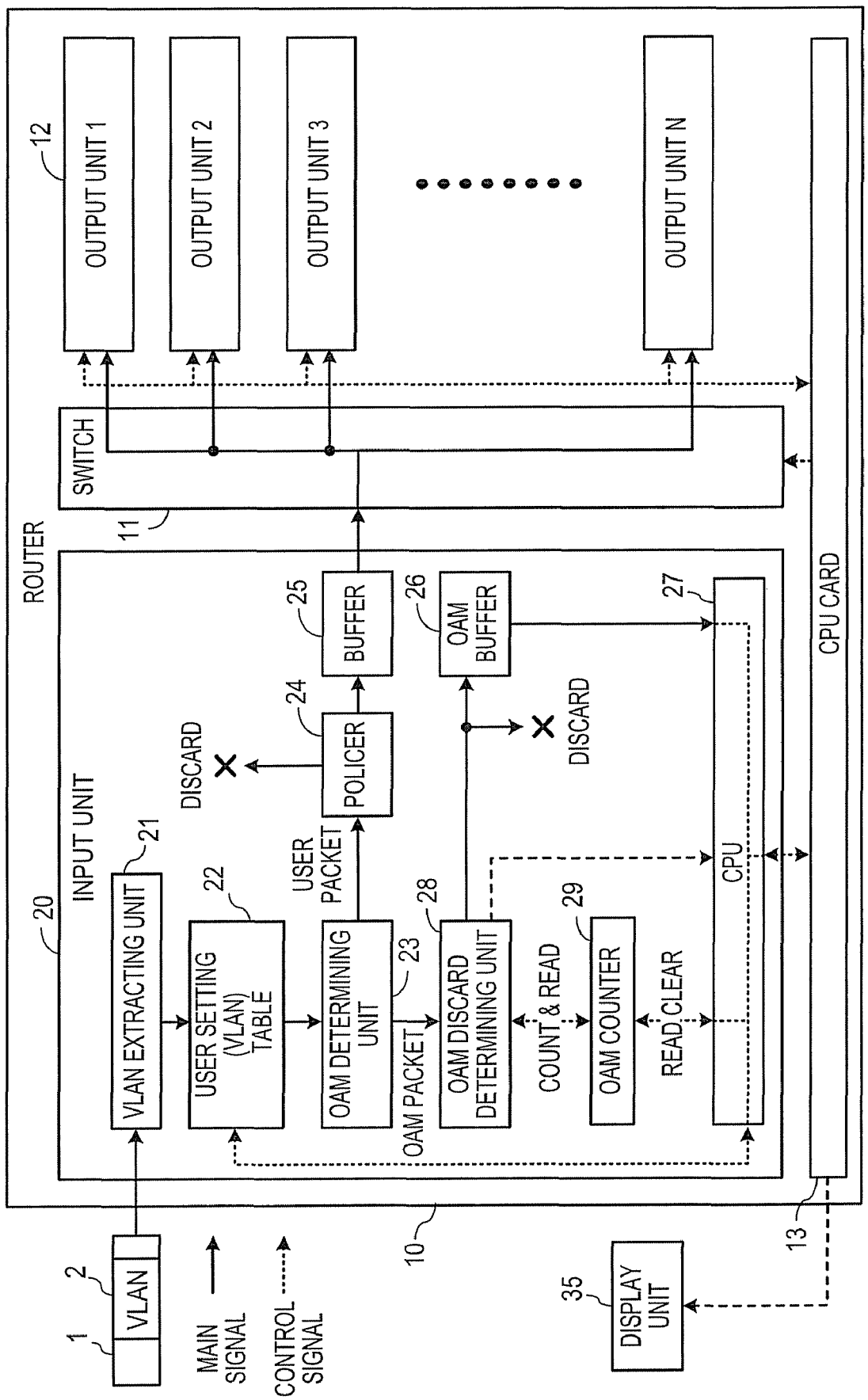
FIG. 1 is a diagram illustrating an exemplary configuration of a router according to a first embodiment.

FIG. 1 illustrates an exemplary configuration of a router 10 according to a first embodiment. Solid arrows in FIG. 1 and other figures represent paths through which user or OAM packets are transmitted. The term "MAIN SIGNAL" shown refers to user or OAM packets. The term "CONTROL SIGNAL" shown refers to a signal sent and received in order to cause the router to operate. The paths through which a control signal is transmitted are represented by dashed arrows. The router 10 includes an input unit 20, a display unit 35, a switch 11, output units 12, and a CPU card 13.

The input unit 20 includes an OAM discard determining unit 28, an OAM counter 29, an OAM buffer 26, and a CPU 27 that handle OAM packets. The input unit 20 also includes a VLAN extracting unit 21, a user setting table 22, and an OAM determining unit 23 that handle both OAM and user packets. The router 10 further includes a policer 24 and a buffer 25 used for handling user packets. The output units 12 and the input unit 20 can be implemented as the same interface card.

The VLAN extracting unit 21 identifies user information concerning packets 1 received at the router 10. The VLAN extracting unit 21 extracts a VLAN identifier 2 from the packet 1 and identifies a user by the VLAN identifier 2.

Figure 2:
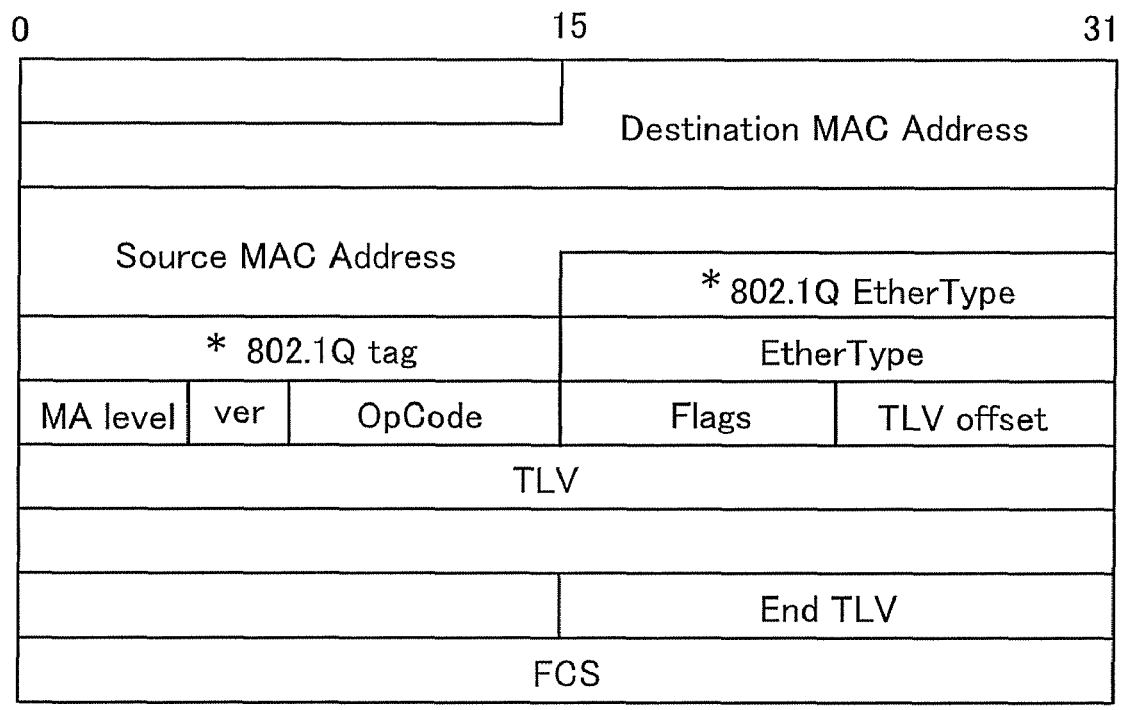
FIG. 2 is a diagram illustrating an exemplary format of an OAM packet.

FIG. 2 illustrates an exemplary format of an OAM packet. The OAM packet includes two fields: "802.1Q EtherType" and "802.1Qtag" fields. Information contained in these fields represents a VLAN tag. In the example described below, the VLAN extracting unit 21 recognizes 802.1Qtag information as user information. However, the method for identifying the user can vary depending on implementation.

The user setting table 22 in FIG. 1 stores settings relating to reception of OAM packets for each user sending OAM packets.

FIG. 3 shows an exemplary user setting table 22. VLAN identifiers 2, each associated with a user, are stored as search keys and information about reception of OAM packets sent by each user is stored as contents in the user setting table 22. Any items of information may be stored as the contents and any number of items of information may be stored. The upper threshold for the amount of OAM packets that can be received (reception threshold) is always stored for every user. The settings contained in the user setting table 22 will be described later in greater detail.

The upper threshold for the amount of OAM packets received may be specified in the number or bytes of received OAM packets. In the example in FIG. 3, the upper threshold for OAM packets received from user D is set to 6,656 bytes and that for OAM packets received from used E is set to 9,999,999 packets. A unique header that is internally used in the router 10 is added to each packet 1 as information indicating setting information in the user setting table 22 relating to the user that sent the packet, and is then sent to the OAM determining unit 23.

In FIG. 1, the OAM determining unit 23 determines whether a packet 1 received is an OAM packet or a user packet. The determination is made by determining whether or not the packet 1 has the OAM packet format as shown in FIG. 2. The method for making the determination can vary depending on implementation. For example, the OAM determining unit 23 may make the determination by using information stored in the EtherType field of the received packet. If the OAM determining unit 23 determines that the packet 1 is a user packet, the OAM determining unit 23 sends the packet 1 to the policer 24. On the other hand, if OAM determining unit 23 determines that the packet 1 is an OAM packet, the OAM determining unit 23 sends the packet 1 to the OAM discard determining unit 28.

The OAM discard determining unit 28 determines whether an OAM packet received should be discarded or not. When the OAM discard determining unit 28 receives an OAM packet or packets, the OAM discard determining unit 28 counts up the OAM counter 29 by the amount of OAM packet(s) received. Here, the "amount of OAM packet(s)" is either the number of OAM packets or bytes of OAM packet(s) and is counted in units set in the user setting table 22 shown in FIG. 3.

FIG. 4 illustrates an example of the OAM counter 29. In the OAM counter 29, VLAN identifiers 2 are recorded as user IDs and the counted amounts of OAM packets received at the router 10 from the users are recorded in association with the VLAN identifiers 2. In the example in FIG. 4, a total of 354 bytes of OAM packets sent from user D were received by the OAM discard determining unit 28 in the router 10 and counted by the OAM counter 29. Also in the example in FIG. 4, the router 10 received 85,495,898 OAM packets from user E. When the router 10 receives one more OAM packet from user E, the counter value for user E will be counted up to "85,495,899 packets".

After the OAM counter 29 counts the received OAM packets, the OAM discard determining unit 28 refers to the value of the OAM counter 29 and compares it with the upper threshold. In the comparison, the OAM discard determining unit 28 obtains the upper threshold set for the user that sent an OAM packet from the router 10 header added to the OAM packet and determines which of the upper threshold and the value of the OAM counter 29 is greater than the other.

In FIG. 1, if the counter value is less than or equal to the upper threshold, the OAM discard determining unit 28 sends the OAM packet to the OAM buffer 26. The packet sent to the OAM buffer 26 is held in the OAM buffer 26, and then sent to the CPU 27 as appropriate according to the capacity of the CPU 27, where it is processed. On the other hand, if the counter value exceeds the upper threshold, the OAM packet is discarded without being sent to the OAM buffer 26. Although which component discards OAM packets depends on implementation, the OAM discard determining unit 28 may discard OAM packets.

The CPU 27 processes OAM packets and, in addition, resets the value of the OAM counter 29. The time intervals at which the OAM counter 29 is reset can be set for each user. When the user setting table 22 is set, the CPU 27 sends the data to be set in the user setting table 22 to the user setting table 22. The amount of OAM packets to be processed by the CPU 27 can be controlled by the time intervals at which the OAM counter 29 is reset and settings in the user setting table 22 such as the upper threshold.

The display unit 35 displays information output from a CPU card 13 provided in the router 10. For example, when the OAM discard determining unit 28 has received an amount of OAM packets greater than or equal to a predetermined amount from a particular user, user information about the user that sent the OAM packets greater than or equal to a predetermined amount may be displayed on the display unit 35. In this case, the OAM discard determining unit 28 notifies the CPU 27 that an amount of OAM packets exceeding the predetermined amount has been received from the particular user. In response to the notification, the CPU 27 transfers the notification to the CPU card 13. The CPU card 13 displays user information provided from the OAM discard determining unit 28 through the CPU 27 on the display unit 35. The display unit can be configured to display information provided directly from other components of the router 10 to the CPU card 13 and information provided to the CPU card 13 through the CPU 27, as well under the control of the CPU card 13.

The policer 24 performs bandwidth control for packets determined to be user packets by the OAM determining unit 23 and discards user packets if needed. The policer 24 functions as a user packet discarding unit that discards user packets when the amount of user packets exceeds a predetermined value. The threshold beyond which the policer 24 discards packets is sometimes referred to as "packet discard threshold" herein. The buffer 25 receives a user packet that has not been discarded by the policer 24 and holds the user packet according to the processing speed of the output unit 12.

In the router 10, user data provided from the input unit 20 is sent to the output unit 12 through a switch 11 and is transmitted from the output unit 12 to the node that is the destination of the user data. If the router 10 includes N output units 12, the switch 11 selects one of first to N-th output units 12 to which the user data is to be sent according to the destination node of the user data and sends the user data to the appropriate output unit 12. The user data sent to the output unit 12 is then transmitted to the destination node. The CPU card 13 controls the switch 11, the output units 12, the input unit 20, and the display unit 35 as needed.

Information in the user setting table 22 does not necessarily need to be added to each packet. ASSP (Application Specific Standard Product) or FPGA (Field Programmable Gate Array) may be used to refer to settings in the user setting table 22 as required.

Option Settings

Option settings for receiving OAM packets at the router 10 will be described with reference to the user setting table 22 in FIG. 3 as required.

(1) "Upper threshold" (reception threshold) is used for determining whether OAM packets should be discarded or not, as described above. The upper threshold can be set for each individual user. As will be described later, users can be grouped and an upper threshold can be set for each group. Furthermore, an upper threshold can be set separately according to the type of OAM specified in an OAM packet.

(2) "Reception control setting" specifies whether an OAM packet should be discarded or not when the value of the OAM counter 29 exceeds the upper threshold. If "Receive" is set in the reception control setting item, OAM packets will not be discarded and all OAM packets will be sent to the CPU 27 even when the value of the OAM counter 29 exceeds the upper threshold. In the example in FIG. 3, "Receive" is set in the reception control setting for user F. Accordingly, OAM packets sent form user F will not be discarded even when the counter value for user F exceeds 64 packets.

(3) "User information display setting" specifies whether user information should be displayed on the display unit 35 when the value of the OAM counter 29 exceeds the upper threshold. While the user information may be a VLAN identifier 2, the user information may be any other identifier that can identify the user. In the example in FIG. 3, "Display" is set in the user information display setting item for user D. Accordingly, when the counter value for user D exceeds 6,656 bytes, the VLAN identifier 2 of user D, "200", is displayed on the display unit 35.

The term "display" as used herein can include not only outputting to a hardware resource capable of displaying information such as the display unit 35 but also providing information to software. If "Display" is enabled, the user transmitting OAM packets exceeding the upper threshold can be identified. For example, if OAM packets are input from a user at an abnormal rate, an operator can identify the user from the display on the display unit 35 and appropriately respond to the situation to prevent a system failure.

(4) "Group setting" specifies whether settings are made for a group. Any number of users can be included in a group. In FIG. 3, "Group 1" is set in the "Group setting" item for users A, B, and C as the members of the same group. Therefore the settings in all items for users A, B, and C are the same.

If all users that use one interface card are set as the members of one group in the "Group setting" item, "card setting" can be made for the users of the interface card. "Card setting" enables settings such as the upper threshold to be set for each interface card. That is, the same settings are made in all items for the users that use the same interface card. Card setting has the advantage that settings can be simply made when other hardware or software requires the settings for the input unit 20. The "Card setting" option may be provided separately so that turning the "Card setting" option to "ON" will set all users that use one interface card as the members of the same group.

A switching unit provided in the OAM discard determining unit 28 may search through the user setting tables 22 for the setting information of group setting and card setting to determine and switch to handling OAM packets on a user-by-user, group-by-group, or card-by-card basis.

(5) "OAM type setting" specifies whether or not a received OAM packet should be counted by the type of operation specified in the OAM packet. For example, the OAM type setting for Group 1 of users A, B, and C is "Enabled", therefore the OAM counter 29 in FIG. 1 counts the amount of received OAM packets by the type of operation specified in each OAM packet. In addition, when the OAM type setting is "Enabled", the upper threshold for OAM packets can be set for each type of operation specified in OAM packets.

If the OAM type setting is "Enabled", the OAM determining unit 23 determines what operation is specified in an OAM packet as an operation performed using the OAM packet. When the OAM determining unit 23 receives an OAM packet in the format as shown in FIG. 2, the OAM determining unit 23 reads information concerning OAM to identify the specified operation. Information concerning OAM is contained in the fields in FIG. 2 excluding the preamble, destination MAC address, source MAC address, VLAN tag, and FCS (Frame Check Sequence) fields. While it can vary depending on implementation, the operation specified can be identified from the information contained in the OpCode field, for example. Examples of OAM types include CC, LB, and LT given in FIGS. 3 and 4. Here, CC (Continuity Check) represents a fault management function that sends and receives OAM packets of this type between nodes to determine whether there is a fault on the network. LB (Loop Back) is a fault management function that sends packets from a host to another host with which network connectivity is to be verified and checks to see whether the packets have been received by the destination host and whether the source host has received response packets from the destination host. LT (Link Trace) is a fault management function in which a host sends OAM packets to another host with which network connectivity is to be verified and all nodes through which the OAM packets have passed return acknowledgements to the source host.

The types of OAM packets that the OAM determining unit 23 can handle are not limited to these. Any type of OAM packet can be specified. In addition to fault management functions, any functions can be used such as performance management functions. When the router 10 has received an OAM packet from a user for whom "Enabled" is set in the OAM type setting item, the OAM determining unit 23 functions as an OAM type determining unit that autonomously switches between processes performed at a component such as the OAM counter 29 according to the type of the OAM packet. For example, the OAM determining unit 23 may identify the type of an OAM packet and provide information indicating the type to the OAM discard determining unit 28. The OAM discard determining unit 28 may notify the type of the OAM indicated by the information to the OAM counter 29, which then may count up. An OAM type determining unit may be provided in the OAM determining unit 23 that determines the type of an OAM packet and notifies the type to the OAM counter 29.

(6) "Effective data setting" is effective in counting the number of bytes of received OAM packets. When the "Effective data setting" is "Enabled", the OAM counter 29 counts the number of bytes of the payload of a received OAM packet plus the number of bytes of the preamble and bytes used for recording IFG (Interframe gap). Accordingly, determination can be made as to whether the upper threshold has been exceeded or not based on the number of bytes of packets actually received by the router 10, including the of bytes of sections such as the preamble used in communication.

(7) "Packet count setting" is "Enabled" when the number of received OAM packets is to be counted.

One or more of the options described above can be set in any combination, provided that no contradiction arises between them. For example, (a) the setting that sets the upper threshold for the amount of OAM packets as all cards belong to one group and (b) the setting that displays user information display can be set at the same time. In this case, the settings (a) and (b) are applied to all users that have sent OAM packets to the set interface card. On the other hand, setting (a) described above cannot be used in combination with (c) setting that sets users A, B, and C as belonging to a group and users D, E, and F as belonging to different groups so that the four groups are handled individually. However, the upper threshold for OAM packets should always be set for any combination of settings for processing OAM packets.

Exemplary Operation of the Router

Figure 5:
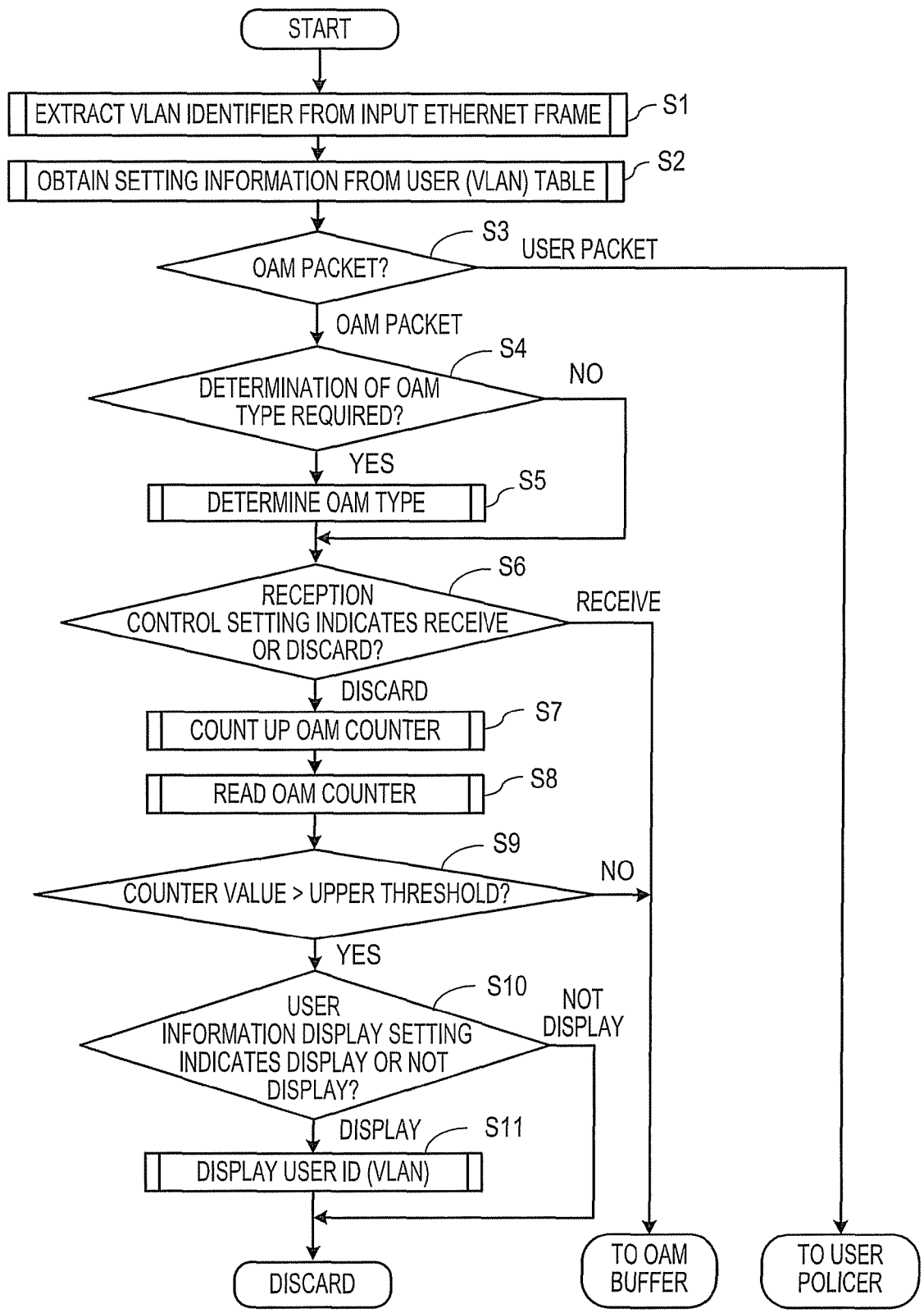
FIG. 5 is a flowchart illustrating exemplary operation of the router.

FIG. 5 is a flowchart illustrating exemplary operation of the router 10. When the input unit 20 of the router 10 receives a packet 1, the VLAN extracting unit 21 examines a field of the packet 1 such as the 802 Qtag field to extract a VLAN identifier 2 (step S1). The input unit 20 uses the extracted VLAN identifier 2 as the key to search through the user setting table 22 to obtain settings associated with the VLAN identifier 2 (step S2). As stated earlier, the obtained settings can be appended to the tail of the packet 1 as information unique to the router 10.

After the settings in the user setting table 22 are identified, the OAM determining unit 23 checks the format of the packet 1 to determine whether the packet 1 is an OAM packet or not (step S3). If the packet 1 is a user packet, the packet 1 is provided to the policer 24. On the other hand, if the packet 1 is an OAM packet, the OAM determining unit 23 determines whether the type of OAM should be determined or not and, depending on the setting in the user setting table 22, determines the type of OAM (steps S4 and S5). The OAM type determination can be made by an OAM type determining unit provided in the OAM determining unit 23 as stated above. After the processing for determining the type of OAM, the OAM packet is sent to the OAM discard determining unit 28.

When the OAM discard determining unit 28 receives the OAM packet, the OAM discard determining unit 28 determines whether "Receive" is set in the reception control setting item (step S6). If the reception control setting item is not contained in the user setting table 22, the OAM discard determining unit 28 may assume that "Discard" is set as the reception control setting. If "Receive" is set in the reception control setting item, the OAM packet is sent to the OAM buffer 26. On the other hand, if "Discard" is set in the reception control setting item, the OAM discard determining unit 28 causes the OAM counter 29 to count up (step S7). Here, if settings such as the card setting, group setting, OAM type setting, effective data setting, and/or packet count setting described above have been made, the OAM counter 29 counts according to the settings.

Upon completion of the counting up by the OAM counter 29, the OAM discard determining unit 28 reads the counter value and determines which of the upper threshold and the counter value is greater than the other (steps S8 and S9). If the counter value is not greater than the upper threshold, the OAM discard determining unit 28 does not discard the OAM packet and sends the OAM packet to the OAM buffer 26.

On the other hand, if the counter value is greater than the upper threshold, the OAM discard determining unit 28 checks the user information display setting item to see whether "Not display" is set (step S10). Here, if the user information display setting item is not contained in the user setting table 22, the OAM discard determining unit 28 may assume as if "Display" is set in the user information display setting item. When "Display" is set in the user information display setting item, the VLAN identifier 2 is provided to the CPU 27. The CPU 27 provides the information provided from the OAM discard determining unit 28 to the CPU card 13, which in turn causes the display unit 35 to display the user information (step S11). After the OAM discard determining unit 28 provides the VLAN identifier 2 to the CPU 27, the OAM discard determining unit 28 discards the OAM packet. Alternatively, steps S10 and S11 of the flowchart in FIG. 5 may be performed after the OAM packet is discarded.

Figure 6:
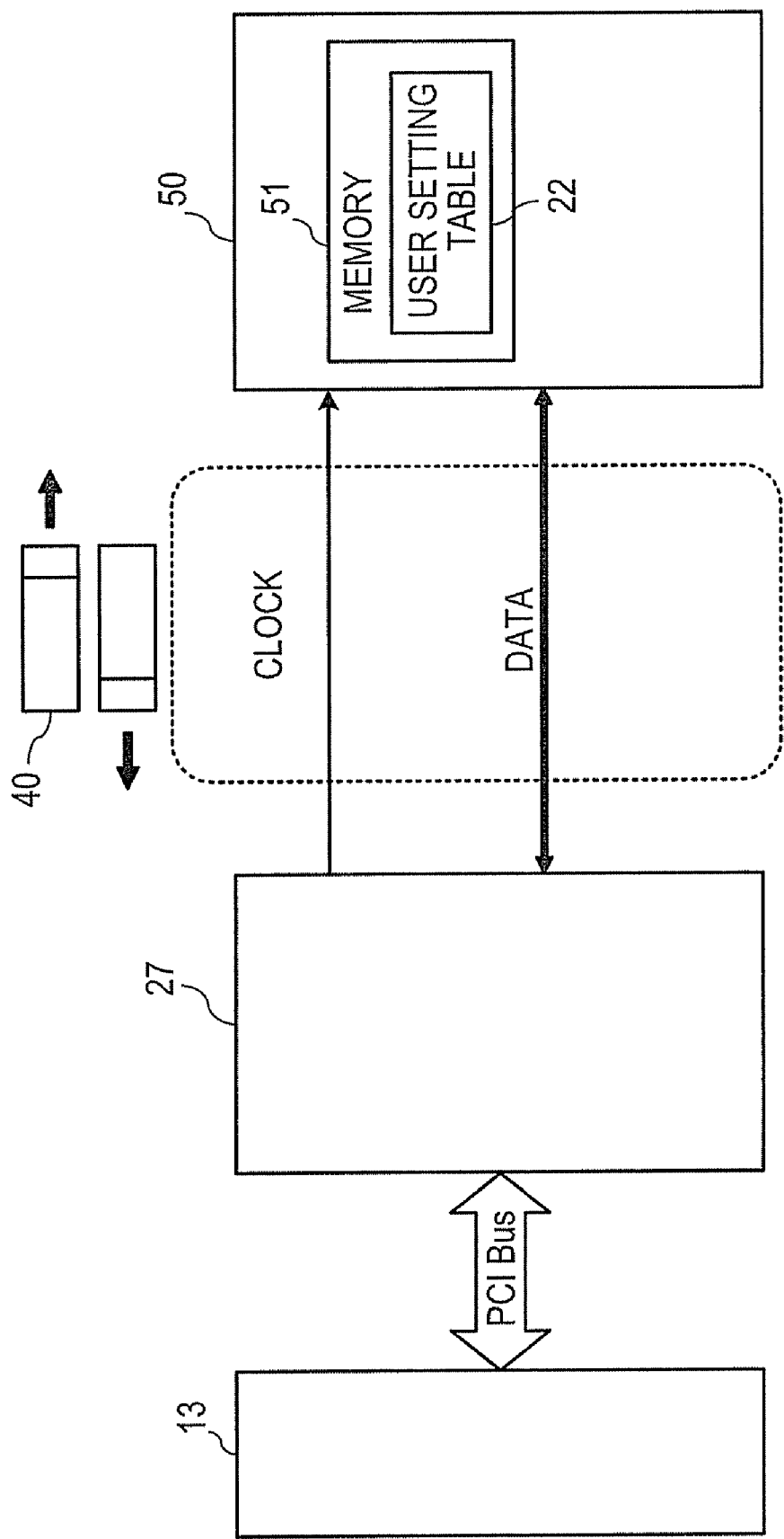
FIG. 6 is a diagram illustrating a method for setting a user setting table.

A method for setting the user setting table 22 will be described below. The method for setting the user setting table 22 is the same in any of the embodiments described herein. FIG. 6 is a diagram illustrating the method for setting the user setting table 22. It is assumed in FIG. 6 that the user setting table 22 is stored in a memory 51 included in a processing unit 50. The processing unit 50 is a part of an input unit 20 and includes the memory 51 storing the user setting table 22. Depending on implementation, the processing unit 50 can include, in addition to the memory 51, at least one of the VLAN extracting unit 21, OAM determining unit 23, policer 24, buffer 25, OAM buffer 26, OAM discard determining unit 28, and OAM counter 29.

Figure 7:
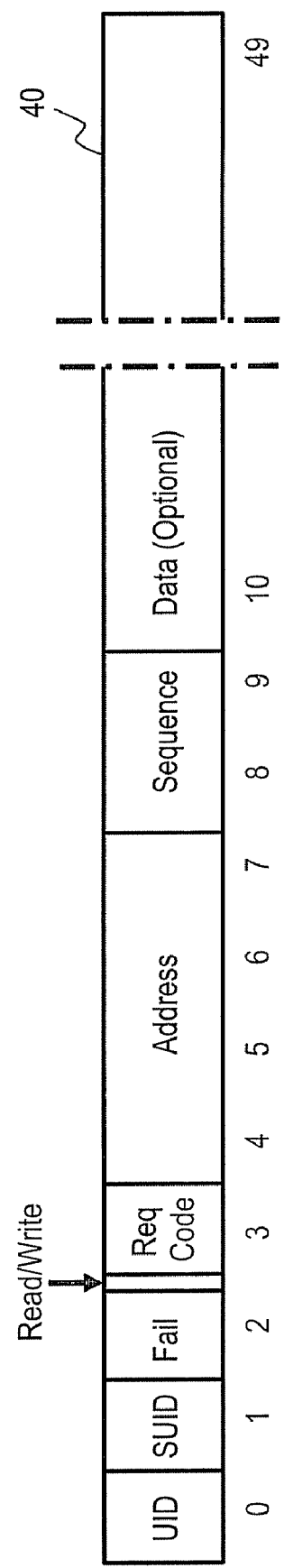
FIG. 7 is a diagram illustrating a data structure of a signal used for setting the user setting table.

When the user setting table 22 is to be set, the CPU card 13 receives information to be set in the user setting table 22 from an external apparatus. The external apparatus may be any apparatus capable of sending and receiving data to and from the CPU card 13. Then, the CPU card 13 provides the information to be set in the user setting table 22 to the CPU 27 through a PCI bus. When the CPU 27 receives the information to be set in the user setting table 22, the CPU 27 synchronizes itself with the processing unit 50 by using a clock and then sends a control message 40 as shown in FIG. 7 to the processing unit 50 to set the information in the user setting table 22. Fields of the control message 40 such as Fail, ReqCode, and Sequence fields contain control information required for the CPU 27 to set information in and read information from the user setting table 22. A Data field contains data to be set in the user setting table 22 or data to be read from the user setting table 22 and provided to the CPU 27. A Read/Write field is used for identifying whether the control message 40 contains information to be written in the user setting table 22 or information read from the user setting table 22.

By using the router 10 described above on a network, the amount of control packets in the router 10 to be handled can be controlled. Therefore, the load of OAM packet processing imposed on the CPU 27 can be reduced and, consequently, degradation of the throughput of the CPU 27 and hang-up of the CPU 27 can be prevented and stable maintenance and management of the network can be ensured. Since the amount of OAM packets to be handled by the CPU 27 can be set to such a value that the throughput of the CPU 27 does not decrease, the processing speed of the CPU 27 for OAM packets can be reduced to a value smaller than the processing speed of the CPU used for processing user packets.

In the present embodiment, buffer overflow can be prevented by controlling the amount of OAM packets. If the amount of OAM packets exceeds the capacity of the OAM buffer 26, overflow of the OAM buffer 26 can occur. If buffer overflow occurred, OAM packets in the OAM buffer 26 would be discarded. If OAM packets from multiple users were held in the OAM buffer 26, a large amount of OAM packets sent from a single user can cause buffer overflow. If buffer overflow occurred, the OAM packets held in the OAM buffer 26, not only OAM packets of the user that has sent a large amount of OAM packets but also an OAM packet of a user that has sent only the OAM packet, would be discarded. However, the router 10 according to the present embodiment can monitor the amount of OAM packets sent from each individual user in controlling the amount of OAM packets and, for a user that has sent a large number of OAM packets, can adjust the amount of OAM packets to be processed by the CPU 27. That is, the router 10 is capable of not merely ensuring a proper throughput of the CPU 27 and preventing overflow of the OAM buffer 26, but also enabling OAM packets sent from a user sending a small amount of OAM packets to be processed without being discarded even when some of the OAM packets sent from a user sending a large amount of OAM packets are discarded. Therefore, a user sending a small amount of OAM packet can also perform Ethernet maintenance and management. On the other hand, a user sending a large number of OAM packets has a greater chance of being able to perform Ethernet maintenance and management even if some of the OAM packets are not processed. Therefore, discarding some of the OAM packets sent by such a user is less likely to cause a problem in maintenance and management.

Furthermore, since the amount of OAM packets can be controlled according to individual users by making settings in the user setting table 22 and controlling the time intervals at which the OAM counter 29 is reset for each individual user, maintenance and management can be performed according to users' needs. By using the group setting or card setting, OAM packets sent from multiple users can be managed together.

Second Embodiment

Apparatus Configuration

Figure 8:
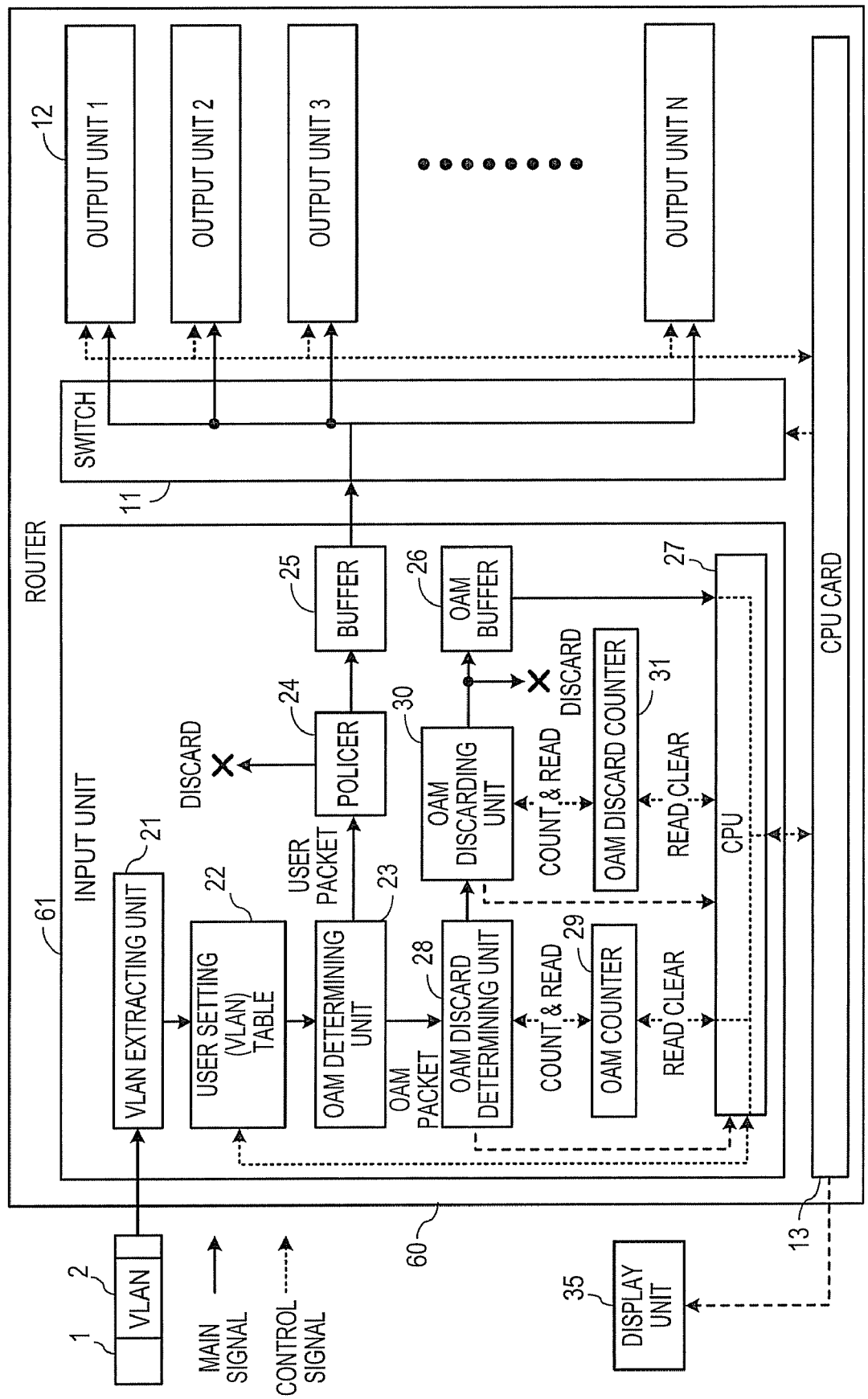
FIG. 8 is a diagram illustrating an exemplary configuration of a router according to a second embodiment.

FIG. 8 illustrates an exemplary configuration of a router 60 according to a second embodiment. The router 60 includes an input unit 61, a switch 11, output units 12, a CPU card 13, and a display unit 35. The switch 11, the output units 12, and the CPU card 13 are the same as those of the router 10 descried in the first embodiment.

The input unit 61 includes a VLAN extracting unit 21, an OAM determining unit 23, an OAM discarding unit 30, and an OAM discard counter 31, like the input unit 20 described with reference to FIG. 1. The components such as the VLAN extracting unit 21 and the OAM determining unit 23 that are the same as those in the first embodiment have the same configurations and operate in the same way as in the first embodiment, except for the user setting table 22 and the CPU 27.

The OAM discarding unit 30 discards OAM packets if the OAM discard determining unit 28 determines that the OAM packets need to be discarded. Before discarding the OAM packets, the OAM discarding unit 30 counts up the OAM discard counter 31. The count-up is performed according to a setting in the user setting table 22 such as on a user-by-user basis or group-by-group basis.

The OAM discard counter 31 stores the amount of OAM packets to be discarded. FIG. 9 illustrates an example of the OAM discard counter 31. User IDs and VLAN identifiers 2 are recorded in the OAM discard counter 31 and the counted amount of OAM packets to be discarded are also recorded in association with them. Here, the "amount of OAM packets to be discarded" is expressed in number of packets or bytes, like the amount of OAM packets, and is counted in the units expressing the upper threshold set in the user setting table 22. For example, in the example in FIG. 9, 56 bytes out of the OAM packets sent from user D were discarded. The value of the OAM discard counter 31 is reset by CPU 27 as needed.

The CPU 27 performs the operation described with respect to the first embodiment and, in addition, resets the value of the OAM discard counter 31. As with the OAM counter 29, the time intervals at which the OAM discard counter 31 is reset can be set for each individual user.

The display unit 35 functions in the same way described with respect to the first embodiment and, in addition, displays the VLAN identifier 2 or other indication of a user the number of whose discarded OAM packets reaches a predetermined value or greater in response to a direction from the CPU card 13. Information indicating the user the number of whose discarded OAM packets reaches a predetermined number or greater is provided by the OAM discarding unit 30 referring to the value of the OAM discard counter 31 to the CPU 27. The CPU 27 provides the information to the CPU card 13, which in turn causes the display unit 35 to display the information.

Option Settings

FIG. 10 shows an example of the user setting table 22 provided in the router 60. Option settings for receiving OAM packets will be described with reference to the user setting table 22 in FIG. 10 as required. The setting items "Upper threshold" to "Packet count setting" in the table shown in FIG. 10 in the second embodiment can be set in the same manner as has been descried in the first embodiment with reference to FIG. 3.

The table shown in FIG. 10 further includes "Discard user information display setting", "Discard group setting", "Discarded OAM type setting", "Discarded effective data setting", and "Discarded packet count setting" items. The user setting table 22 in FIG. 10 is illustrative only. The user setting table 22 may include only some of the contents shown in FIG. 10 or any other information may be added to the user setting table 22 as needed.

(8) "Discard user information display setting" specifies whether user information indicating a user, a large number of whose OAM packets have been discarded, should be displayed on the display unit 35. The term "display" as used here includes not only outputting to a hardware resource capable of displaying information, but also providing a user identifier to software, as in the case of "User information display setting".

If "Display" is set in the "Discard user information display setting" item, a user, a large number of whose OAM packets have been discarded, becomes identifiable. This enables a user inputting OAM packets at an abnormal rate to be identified. By appropriately responding to the situation, a system fault can be prevented. By setting "Display" in the "Discard user information display setting" item, a user that has to send a large number of OAM packets for reasons such as setting changes or system reconfiguration can be monitored for and the upper threshold for the user can be changed if required.

"Display threshold" is used when "Display" is set in the "Discard user information display setting" item. When the value of the OAM discard counter 31 exceeds the display threshold, user information is displayed. The OAM discarding unit 30 may provide the user information to the CPU card 13 through the CPU 27 and the CPU card 13 may cause the display unit 35 to display the user information. Depending on implementation, other components may direct the display unit 35 to display the user information.

In the example in FIG. 10, when the value of the OAM discard counter 31 for OAM packets indicating LT for users A, B, and C in Group 1 reaches 50 bytes or greater, user information will be displayed. In the example in FIG. 9, the value of the OAM discard counter 31 for LT for the group of users A, B, and C is 98 bytes. Accordingly, the OAM discarding unit 30 provides user information indicating users A, B, and C to the CPU 27. The CPU 27 provides the information to the CPU card 13, which in turn causes the display unit 35 to display the user information indicating the users A, B, and C. Since users A, B, and C belong to the same group, the OAM discarding unit 30 or other components may provide information identifying the group to the CPU card 13, which in turn causes the display unit 35 to display the information identifying the group to which users A, B, and C belong.

(9) Like the "Group setting" (see option (4) in the first embodiment), "Discard group setting" specifies whether various settings should be made on a group-by-group basis. For example, when OAM packets sent from any of users A, B, and C constituting one group have been discarded, the OAM discard counter 31 shown in FIG. 9 counts the number of bytes of the discarded OAM packets.

As with the "card setting", users that use one interface card can be set as members of the same discard group, thereby allowing operations concerning discard of OAM packets to be performed for all the users using that interface card. Depending on implementation, settings used for managing discard of OAM packets on an interface card basis can be stored in the user setting table 22 as "Card discard setting". When "ON" is set in the "Card discard setting" item, the same settings are made in all items for all users using the same interface card.

(10) "Discarded OAM type setting" is used for counting the amount of discarded OAM packets by the type of operation specified in the OAM packets. For the group of users A, B, and C, the discarded OAM type setting is "Enabled" as shown in FIG. 10. Accordingly, the OAM discard counter 31 shown in FIG. 9 counts separately the amount of CC, LB, and LT OAM packets to be discarded. The type of OAM is determined by the OAM determining unit 23 as described in the section of "Effective data setting".

(11) Like the "Effective data setting" (see option (6) in the first embodiment), the "Discarded effective data setting" is effective when the number of bytes of OAM packets to be discarded is counted. When the "Discarded effective data setting" is "Enabled", the OAM discard counter 31 counts the number of bytes of the payload of received OAM packets as well as the number of bytes of the preamble and bytes of the field in which IFG is recorded.

(12) "Discarded packet count setting" is "Enabled" to count the number of OAM packets to be discarded.

One or more of the options described above and options (1) through (7) described in the first embodiment can be set in any combination, provided that no contradiction arises between them. However, the upper threshold for the amount of OAM packets should always be set for any combination of settings for processing OAM packets.

Exemplary Operation of the Router

Figure 11:
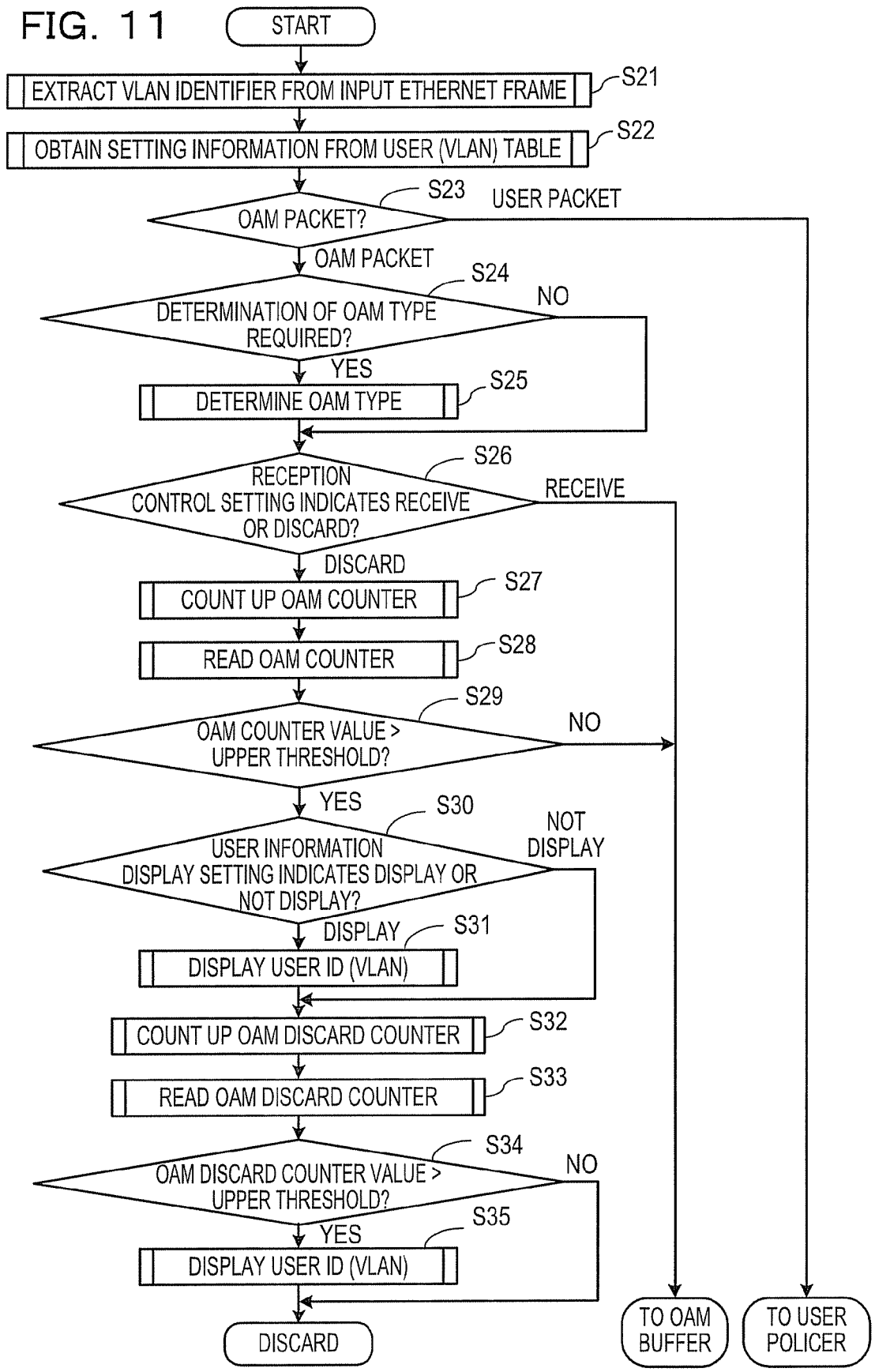
FIG. 11 is a flowchart illustrating exemplary operation of the router.

FIG. 11 is a flowchart illustrating exemplary operation of the router 60. Here, operation performed when "Display" is set in the "Discard user information display setting" item will be described.

Steps S21 through S31 are the same as steps S1 through S11 described with reference to FIG. 5. When the router 60 receives a packet 1, the VLAN extracting unit 21 extracts a VLAN identifier 2 from the packet 1 and the router 60 identifies data associated with the VLAN identifier 2 in the user setting table 22 (steps S21 and S22). Then, the OAM determining unit 23 separates packets into user packets or OAM packets (step S23) and step S24 and the subsequent steps will be performed for the OAM packets. The OAM determining unit 23 determines the type of the OAM packets as needed and then the OAM discard determining unit 28 checks the reception control setting for each user (step S26).

If "Receive" is not set in the "Reception control setting" item, the OAM discard determining unit 28 counts up the OAM counter 29 and compares the value of the OAM counter 29 with the upper threshold (steps S26 through S28). If the counter value is greater than the upper threshold, the OAM discard determining unit 28 provides user information to the CPU 27 as required and sends the OAM packet to be discarded to the OAM discarding unit. The user information provided to the CPU 27 is displayed on the display unit 35 by the CPU card 13 (steps S29 through S31). On the other hand, if the counter value is less than or equal to the upper threshold, the OAM packet is not discarded and is sent to the OAM buffer 26. The OAM discard determining unit 28 may send the OAM packet to the OAM buffer 26 directly or through the OAM discarding unit 30. That is, the path through which the OAM packet is sent to the OAM buffer 26 can vary depending on implementation. If the OAM packet is sent to the OAM buffer 26 through the OAM discarding unit 30, information indicating whether the OAM packet is to be discarded or not may be added to the OAM packet or any method may be used so that the OAM discarding unit 30 can identify the OAM packet to be discarded.

Upon reception of the OAM packet to be discarded, the OAM discarding unit 30 counts up the OAM discard counter 31 (step S32). Here, the amount of OAM packets to be discarded are counted according to settings such as the discarded OAM type setting in the user setting table 22 containing the option settings described above. Upon completion of the counting up of the OAM discard counter 31, the OAM discarding unit 30 reads the value of the OAM discard counter 31 and compares the value of the OAM discard counter 31 with the display threshold (step S34). If the value of the OAM discard counter 31 is greater than the display threshold, the OAM discarding unit 30 provides the user information to the CPU 27 and discards the OAM packet. The CPU 27 provides the provided user information to the CPU card 13, which in turn causes the display unit 35 to display the user information (step S35). On the other hand, if the value of the OAM discard counter 31 is less than or equal to the display threshold, the OAM discarding unit 30 discards the OAM packet without displaying the user information.

If "Not display" is set in the "Discard user information display setting" item, the OAM discarding unit 30 discards the OAM packet without performing steps S34 and S35 of FIG. 11.

By using the router 60 described above on the network, the amount of control packets in the router 60 to be handled can be controlled to reduce the load of the processing of OAM packets imposed on the CPU 27 as with the router 10. Furthermore, the amount of OAM packets discarded by using the OAM discarding unit 30 and the OAM discard counter 31 and a user, a large number of OAM packets of which has been discarded, can be readily identified, thereby facilitating the maintenance and management of the network.

Third Embodiment

While the first and second embodiments have been described with respect to implementations in which the OAM discard determining unit 28, the OAM counter 29, the OAM discarding unit 30, and the OAM discard counter 31 are implemented in hardware, these components can be implemented in software as well.

Figure 12:
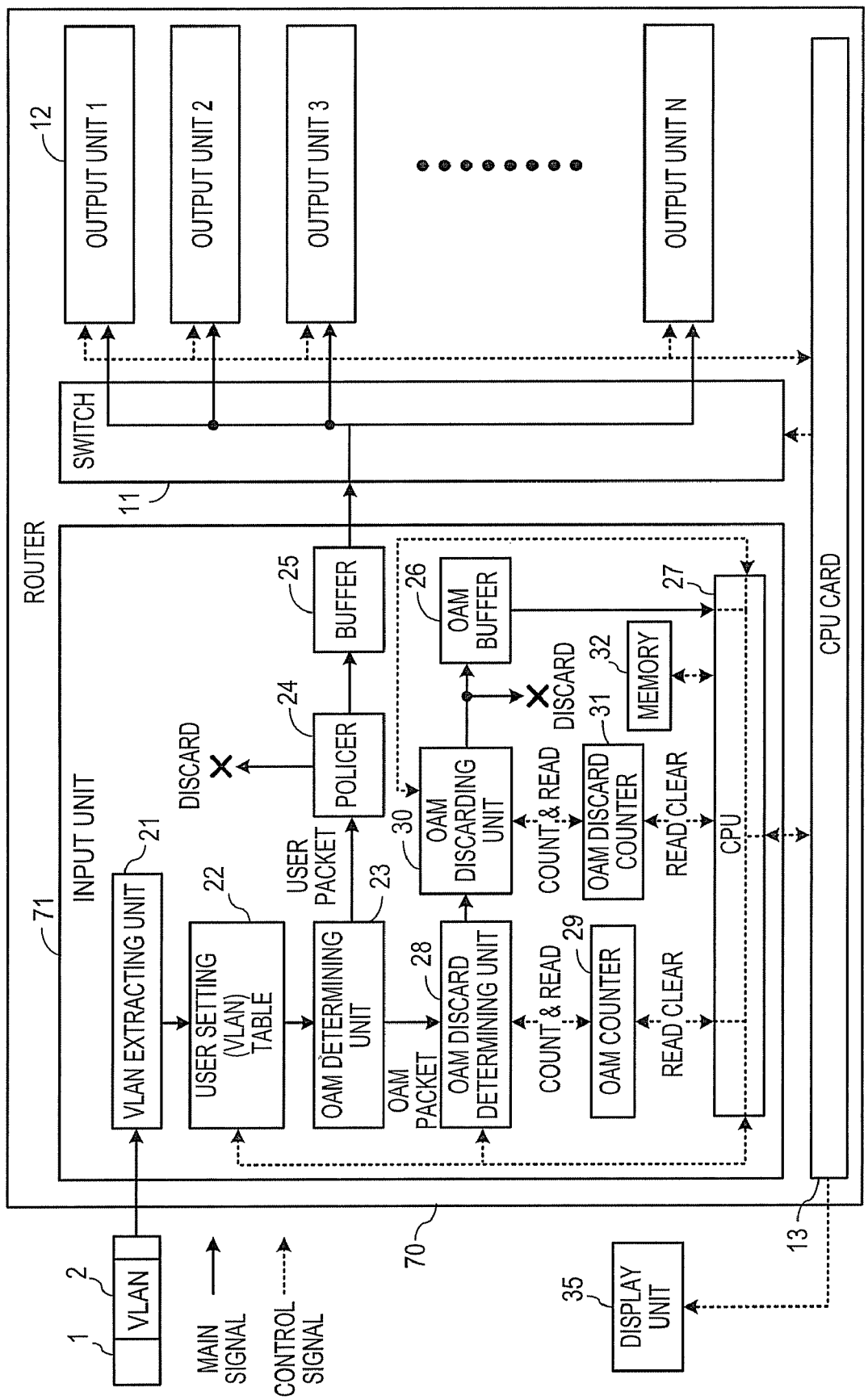
FIG. 12 is a diagram illustrating an exemplary configuration of a router according to a third embodiment.

FIG. 12 is a diagram illustrating an exemplary configuration of a router 70 according to a third embodiment. The router 70 includes an input unit 71, a switch 11, output units 12, a CPU card 13 and a display unit 35. The configuration of the router 70 according to the third embodiment is the same as those of the first and second embodiments, except for the configuration of the input unit 71.

The input unit 71 includes a VLAN extracting unit 21, a user setting table 22, an OAM determining unit 23, a policer 24, a buffer 25, an OAM buffer 26, a CPU 27, and a memory 32 as hardware components. Components such as the VLAN extracting unit 21 has the configurations as described with respect to the first embodiments.

The memory 32 includes a ROM and/or a RAM, for example, and stores programs and data used in processing. The CPU 27 uses the memory 32 to execute a program to implement the functions of the OAM discard determining unit 28, the OAM counter 29, the OAM discarding unit 30, and the OAM discard counter 31 in software. The functions of the components such as the OAM discard determining unit 28 and OAM discarding unit 30 implemented in software have the same functions as described with respect to the first or second embodiment. However, if the OAM discard determining unit 28 is implemented in software, the CPU 27 may make determination as to which of the value of the OAM counter 29 and the upper threshold is greater than the other, as needed. Similarly, if the OAM discarding unit 30 is implemented in software, the CPU 27 may determine which of the value of the OAM discard counter 31 and the display threshold is greater than the other. By implementing part of the input unit 71 in software in this way, the size of hardware can be reduced and the router can be implemented with small-sized circuitry.

Alternative Embodiments

The present invention is not limited to the embodiments described above. Various modifications can be made to the embodiments. Some examples of variations will be described below.

While the input units 20 and 61 in the first and second embodiments are implemented in hardware and part of the input unit 71 that relates to processing of OAM packets is implemented in software in the third embodiment, these are illustrative only. All of the input unit may be implemented in hardware and any part of the input unit may be implemented in software. If any of the functions of the input unit are implemented in software, a memory is provided in the input unit as shown in FIG. 12 and a program stored in the memory is executed by the CPU 27 to implement the functions.

The OAM discard determining unit 28 or the OAM discarding unit 30 discards OAM packets in the foregoing description. However, depending on implementation, a discarding unit that discards OAM packets may be provided in the input unit. Alternatively, the discarding unit may be implemented as part of the OAM discard determining unit 28 or the OAM discarding unit 30.

To reset the OAM counter 29 or the OAM discard counter 31, the CPU 27 may send a "reset notification" in which a user for whom the reset is to be made is specified to the OAM counter 29 or the OAM discard counter 31. Upon reception of the reset notification, the OAM counter 29 or the OAM discard counter 31 resets the counter value for the user specified in the reset notification. The timing at which the reset notification is to be sent can be set for each individual user and can be recorded in the user setting table 22 or the like as needed. When the value of the OAM counter 29 is reset, the counter value will be smaller than the upper threshold if the upper threshold is greater than zero (step S9 of FIG. 5) and, therefore, discard of OAM packets is discontinued and processing of OAM packets by the CPU 27 can be resumed. When the value of the OAM discard counter 31 is reset, the value of the OAM discard counter 31 will be smaller than the display threshold if the display threshold is greater than zero (step S34 of FIG. 11). Therefore, if an operator wants to temporarily disable display of user information indicating any of users a large number of whose OAM packets has been discarded, the operator can reset the OAM discard counter 31 to halt the display until the value of the OAM discard counter 31 reaches the display threshold. The value of the OAM counter 29 for a user that has sent an amount of OAM packets that exceeds the upper threshold may be reset. The value of the OAM discard counter 31 for a user the amount of whose OAM packets exceeds the display threshold may be reset.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A router controlling a route of packets, comprising:
   a counter counting an amount of received control packets on a user-identifier-by-user-identifier basis, the control packets being used for managing a network;
   a discard determining unit comparing a counter value of the counter with a threshold value; and
   a control packet discarding unit determining whether a received control packet includes a reception control setting that indicates that the control packet is not to be discarded and
   when the received control packet does include the reception control setting that indicates that the control packet is not to be discarded, transmitting the received control packet to a processor, wherein the processor is a part of the control packet discarding unit;
   when the received control packet does not include the reception control setting that indicates that the control packet is not to be discarded, transmitting the received control packet including a user identifier for which the discard determining unit determines that the counter value does not exceed the threshold value to the processor and discarding the received control packet including a the user identifier for which the discard determining unit determines that the counter value exceeds the threshold value.

2. The router according to claim 1, wherein the processor receives the control packets that are not discarded by the control packet discarding unit and processes the received control packets, and the threshold value is a threshold representing the amount of control packets that the processor can receive and process.

3. The router according to claim 2, wherein the threshold value can be uniquely set for each individual user.

4. The router according to claim 2, wherein the processor resets the counter value of the counter at predetermined time intervals.

5. The router according to claim 4, wherein the predetermined time interval at which the processor resets the counter value of the counter can be uniquely set for each individual user.

6. The router according to claim 2, wherein the threshold value can be uniquely set for each type of control of the received control packets.

7. The router according to claim 1, wherein the amount of received control packets can be a number of received control packets or a number of bytes of the received control packets.

8. A method for discarding a packet in a router controlling a route of packets, comprising:
   determining whether or not a packet received is a control packet used for network management;
   counting, on a user-identifier-by-user-identifier basis, an amount of packets determined to be the control packets;
   comparing the counted amount of the control packets with a threshold value;
   determining whether each received control packet includes a reception control setting that indicates that the respective control packet is not to be discarded;
   when the received control packet does include the reception control setting that indicates that the control packet is not to be discarded, transmitting the received control packet to be processed; and
   when the received control packet does not include the reception control setting that indicates that the control packet is not to be discarded, transmitting the received control packet including a corresponding user identifier for which the counted amount of control packets does not exceed the threshold value to be processed and discarding a control packet including a corresponding user identifier for which the counted amount of control packets exceeds the threshold value.

9. The method according to claim 1, wherein the threshold value is a threshold representing the amount of control packets that can be processed.

10. The method according to claim 9, wherein the threshold value can be uniquely set for each individual user.

11. The method according to claim 9, wherein the counted amount of control packets is reset at predetermined time intervals.

12. The method according to claim 11, wherein the predetermined time interval at which the counted amount of control packets is reset can be uniquely set for each individual user.

13. The method according to claim 10, wherein the threshold value can be uniquely set for each type of control of the received control packets.

14. The method according to claim 8, wherein the amount of received control packets can be a number of received control packets or a number of bytes of the received control packets.

* * * * *